US006119668A

United States Patent [19]

Richards et al.

[11] Patent Number: 6,119,668

[45] Date of Patent: Sep. 19, 2000

[54] CONNECTION POSITION ASSURANCE ARRANGEMENT FOR ENGINE IGNITION WIRES

[75] Inventors: Thomas C. Richards, Gastonia, N.C.; Harry J. Slaven, Canfield; Harry J. Wilson, Cortland, both of Ohio

[73] Assignee: Delphi Technologies, Inc., Troy, Mich.

[21] Appl. No.: 09/325,821

[22] Filed: Jun. 4, 1999

[51] Int. Cl.[7] .............................. F02P 15/00; H02G 3/00

[52] U.S. Cl. ....................................... 123/635; 123/143 C

[58] Field of Search ......................... 123/143 C, 169 PA, 123/169 R, 634, 635; 174/72 A; 248/74.1, 74.4

[56] References Cited

U.S. PATENT DOCUMENTS

| | | | |
|---|---|---|---|
| 5,046,464 | 9/1991 | Hisatomi et al. | 123/143 C |
| 5,123,619 | 6/1992 | Tomlinson et al. | 248/74.1 |
| 5,168,842 | 12/1992 | Brooks | 123/143 C |
| 5,179,919 | 1/1993 | Foltz, Jr. et al. | 123/143 C |

OTHER PUBLICATIONS

Packard Electric 1995 Product Handbook, pp. H–29 to H–30.

*Primary Examiner*—Tony M. Argenbright

*Attorney, Agent, or Firm*—Robert M. Sigler

[57] ABSTRACT

An engine ignition coil and wiring arrangement uses a connection position assurance device to assist in the connection of ignition wires to an ignition coil and the maintenance of the connections in engine use. The ignition coil is provided with a pair of parallel terminal posts and a mounting surface adjacent a bolt opening. Each of a pair of ignition wires has a cable portion and a connector portion. The connection position assurance device is a T-shaped element having tower portion with a bolt opening extending lengthwise therethrough and pair of connector holding portions extending in opposite directions adjacent one end of the tower portion. Each of the connector holding portions defines a central cavity for the retention of a connector portion of one of the ignition wires. Specific insertion and access openings from the cavity are also provided for insertion and access of the ignition wire connector portion. The connector position assurance device is dimensioned to locate the connector portions of both ignition wires precisely in engagement with the terminal posts of the ignition coil when the device is attached by a bolt to the ignition coil or through the ignition coil to an engine powertrain component with the mounting surfaces of the device and the ignition coil in engagement.

19 Claims, 4 Drawing Sheets

CONNECTION POSITION ASSURANCE ARRANGEMENT FOR ENGINE IGNITION WIRES

TECHNICAL FIELD

The technical field of this invention is engine ignition systems, and particularly the connection of ignition wires to ignition coils.

BACKGROUND OF THE INVENTION

Spark ignited engines, such as are used in motor vehicles, are provided with a plurality of spark plugs for the ignition of combustion in their combustion chambers and one or more ignition coils for the generation of a high voltage to initiate sparks in the spark plugs. The high voltage ignition pulses are conducted from an ignition coil to one or more spark plugs over high voltage ignition wires having a connector at one end for the ignition coil and at the other end for the spark plug.

The connector at the ignition coil end of the ignition wire is a right angle, female connector which is pushed, typically downward, over a terminal post extending typically upward from the ignition coil. In the case of a four cylinder engine, for example, in which two spark plugs are simultaneously sparked by a single coil, an ignition coil may have two such terminal posts extending upwards parallel with each other at a predetermined horizontal separation, one for each of the two spark plugs that are to be simultaneously sparked.

In an engine ignition system assembly, each ignition wire must be installed on an ignition coil by means of the connector being pressed downward over the terminal post, with sufficient force that retention apparatus within the connector is activated to its connector retaining condition. This action requires significant force, since the retention apparatus is designed to hold a connection for a long time in an environment characterized by significant temperature swings and physical vibration. If such a connector is not pressed downward a sufficient distance over the terminal post (or with sufficient force), or if the connector is not kept straight while it is being pressed, the internal retention apparatus might not be fully activated; and the connector may come loose after the engine is put in service. But it is also desired to avoid repetitive stress injuries to those who install ignition wires repetitively on ignition coils in the engine assembly process.

SUMMARY OF THE INVENTION

Thus, it is an object of the invention to provide a connection position assurance arrangement, method and/or device which assists an assembler in correctly installing an ignition wire to an ignition coil and positively maintains the connector of the ignition wire on the terminal post of the ignition coil in engine use. It is an additional object of the invention to provide such an arrangement, method and/or device that reduces the physical stress of such installation.

These objects are realized in an engine ignition system assembly and method in which the ignition coil is provided with a pair of terminal posts projecting therefrom in axially parallel, spaced relationship and an adjacent mounting surface adjacent a bolt opening. Further, each of a pair of ignition wires has a cable portion and a connector portion, the connector portion having an in-line portion aligned with the cable portion and a perpendicular female connecting portion.

A connection position assurance device comprises a T-shaped element having a tower portion with a bolt opening extending lengthwise therethrough and pair of connector holding portions extending in opposite directions adjacent one end of the tower portion and perpendicular thereto. Each of the connector holding portions defines a central cavity, with a connector access opening from the cavity directed parallel to the tower portion away from the one end thereof and a cable access opening directed perpendicularly to the connector access opening. Each of the connector holding portions is adapted to positively hold a connector portion of one of the ignition wires with the cable portion projecting out of the cable access opening and the perpendicular female connecting portion axially parallel with the tower portion and adapted to engage one of the terminal posts of the ignition coil through the connector access opening. The tower portion is further provided with a mounting surface engageable with the mounting surface of the ignition coil, preferably at the end opposite the connector holding portions.

The connection position assurance device is dimensioned to locate the connector portions of both ignition wires precisely in engagement with the terminal posts of the ignition coil when the device is attached by a bolt to the ignition coil or through the ignition coil to the powertrain component with the mounting surfaces of the device and the ignition coil in engagement. The device thus both assists in the accurate and positive installation of the connector portions of the ignition wires in engagement with the terminal posts of the ignition coil and positively maintains the position and engagement achieved in installation.

Additional openings permit the insertion of the ignition wires in the connection position assurance device. A cable insertion opening from the central cavity permits insertion of the cable portion of the ignition wire oriented perpendicularly to the axis of the tower portion, and a connector insertion opening from the central cavity is directed perpendicularly to the tower portion opposite the cable access opening. Thus, the ignition wire cables are first inserted into the central cavities through the cable insertion openings; and then the connector portions are moved into the central cavities through the connector insertion openings, in a direction of movement perpendicular to that of the cable portion insertion.

In addition to meeting the stated objects of assisting in the accurate connection of an ignition wire to an ignition coil, positively maintaining the connection and reducing physical stress to the assembler, the apparatus and method provides an additional advantage when the connection position assurance device is installed on the ignition wiring harness before installation on the ignition coil. The device holds the ignition coil ends of the ignition wires in a fixed spatial relationship to prevent tangling and thus maintains an orderly ignition wire harness. In many cases, the device will replace a separate spacer ordinarily used for this purpose, in which case the added cost due to the device is at least partially offset.

DESCRIPTION OF THE PREFERRED EMBODIMENT

Figure 2:
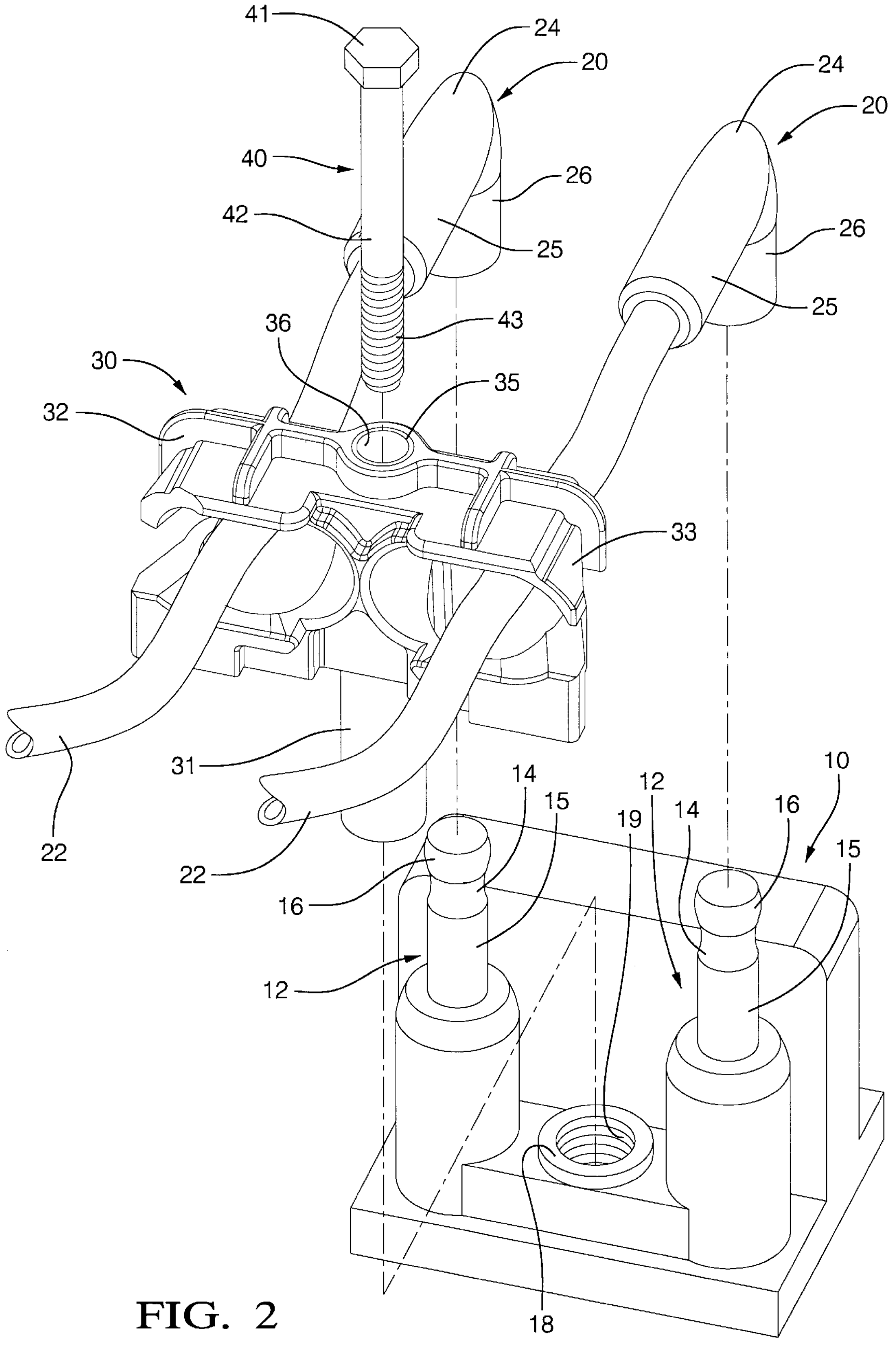
FIG. 2 is an exploded perspective view of a connection position assurance arrangement using the device shown in FIG. 1.

FIG. 2 show an exploded view of a connector position assurance arrangement for engine ignition wires, for example in a vehicle engine ignition system. An essentially standard ignition coil 10, mounted on a engine powertrain component 8, which could be an engine, a transmission or any other such component that forms a convenient mounting platform, that is assumed to include the, is provided with a pair of parallel, vertical output terminal posts 12, each of which provides a high voltage ignition pulse when the coil is fired. Each of terminal posts 12 is formed in the standard manner, with a circumferential, concave groove 14 separating a lower cylindrical shaft 15 from an upper connector retainer 16. In a departure from standard ignition coils, a horizontal mounting surface 18 of ignition coil 10 surrounds a bolt opening 19, which may or may not be internally threaded as shown. In the latter case, bolt opening 19 aligns axially with a threaded or otherwise bolt retaining opening, not shown, in powertrain component 8.

A pair of ignition wires 20 are shown. Each is a high voltage ignition wire for conveying high voltage electrical pulses from one of output terminal posts 12 to a spark plug, not shown. Each ignition wire comprises a cable portion 22 and a connector portion 24. Connector portion 24 has an in-line portion 25, adjacent and in line with cable portion 22, and a perpendicular female connecting portion 26 directed perpendicularly to in-line portion 25. Perpendicular female connecting portion 26 includes internal connector and retainer apparatus, not shown but of standard construction. An example might be a retainer element which is deflected radially outwards against a strong spring bias as connecting portion 26 is pushed downward, in the drawings, over connector retainer 16 and allowed to spring back into groove 14 with further downward movement, thus retaining connector 24 of ignition wire 20 in firm physical and electrical contact with output terminal post 12 of ignition coil 10.

Figure 1:
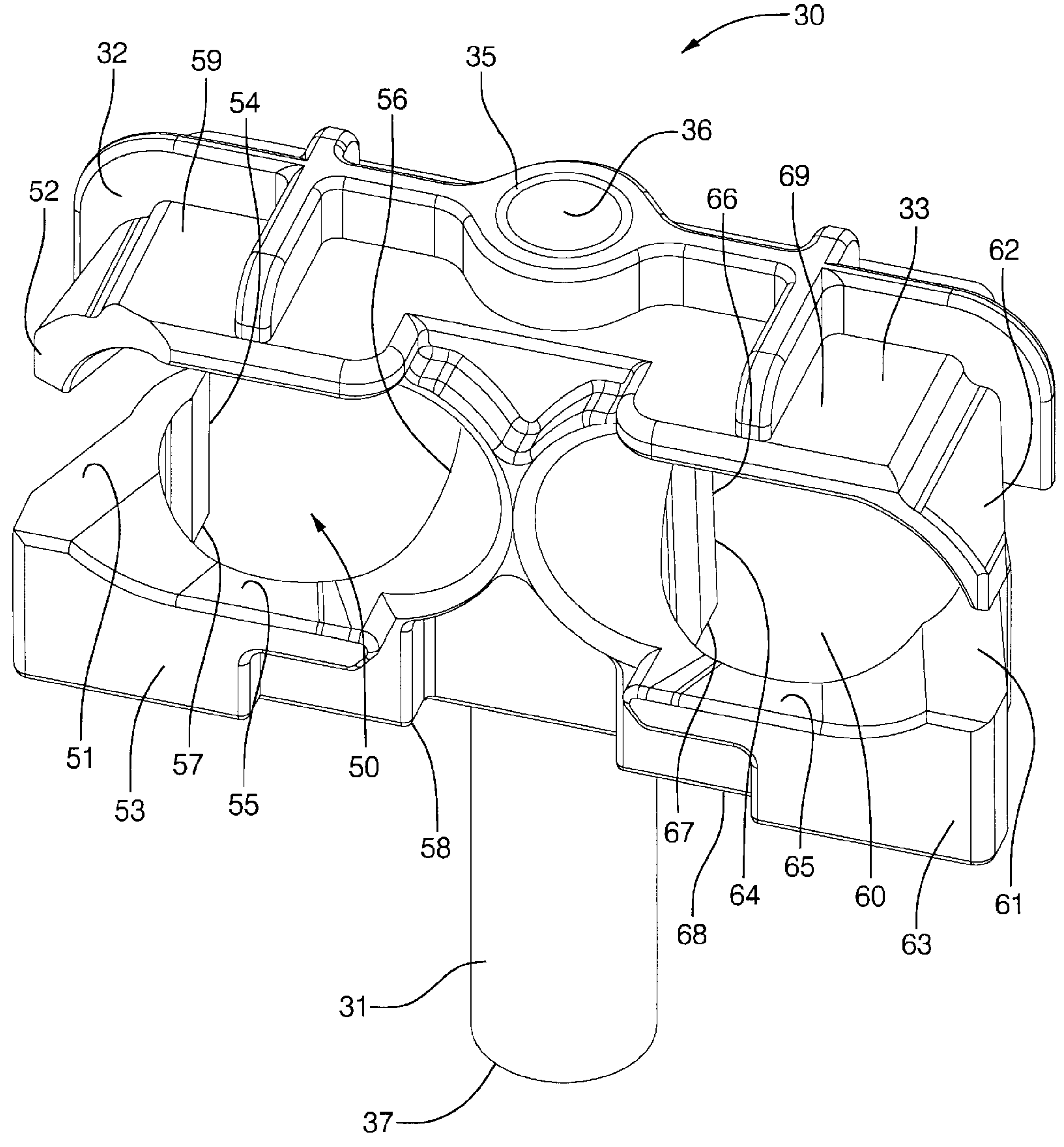
FIG. 1 is a perspective view of a connection position assurance device.

Connection position assurance device 30, shown by itself in FIG. 1, is a generally T-shaped element that assists in the connection of connectors 24 of ignition wires 20 to terminal posts 12 of ignition coil 10 in vehicle assembly and maintains the connection in a positive manner after assembly. Device 30 comprises a tower portion 31, adapted to be mounted vertically on surface 18 of ignition coil 10, and a pair of connector holding portions 32, 33 extending in opposite directions from tower portion 31 near the upper end thereof in FIG. 1. A bolt opening 35 extends lengthwise (vertically in FIG. 1) through tower portion 31. In this embodiment, device 30 is generally a molded plastic piece with, preferably, a tubular insert 36 in bolt opening 35 made of a strong material such as brass or steel, which is capable of bearing large axial loads without deforming. A flat, horizontal mounting surface 37 on the bottom of tower portion 31 is perpendicular to the axis thereof. A retaining bolt 40, with a head 41 and a shaft 42 having a lower threaded portion 43, is adapted to be inserted downward through bolt opening 35 (and tubular insert 36, if present) for insertion a bolt opening 19 of ignition coil 10, which opening may be internally threaded as shown for receiving and retaining bolt 40. When tightened, bolt 40 retains device 30 in a vertical position with respect to ignition coil 10, with horizontal mounting surface 37 at the bottom of device 30 abutting horizontal mounting surface 18 of ignition coil 10. Alternatively, bolt opening 19 of ignition coil 10 may not be threaded; and bolt 40 may project entirely through bolt openings 35 of device 30 and bolt opening 19 of ignition coil 10 to be retained in a threaded or otherwise retaining opening, not shown, in powertrain component 8. In this latter case, bolt 40 holds ignition coil 10 on powertrain component 8 and may replace the bolts normally used for this purpose, with additional cost savings.

Figure 3:
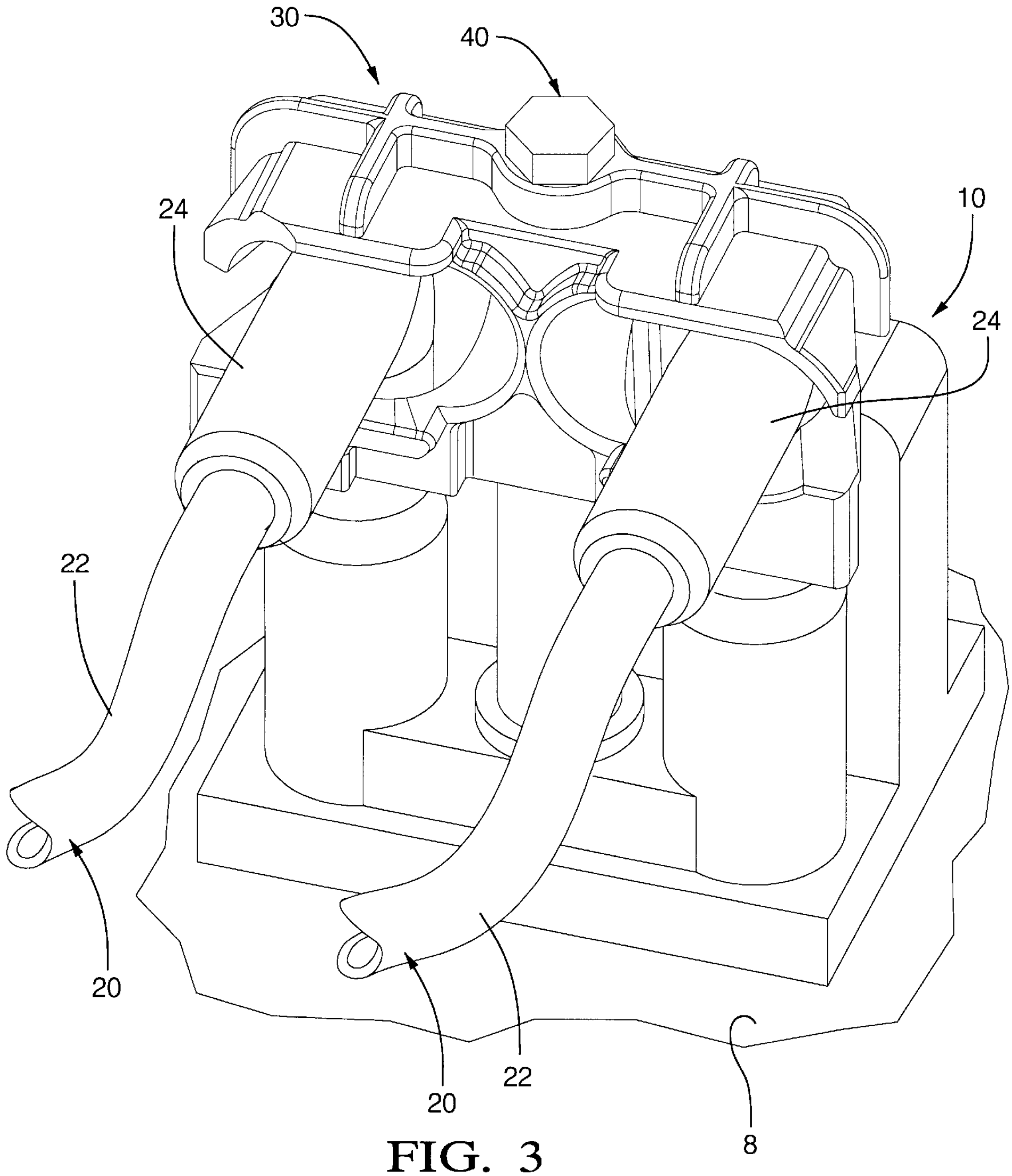
FIG. 3 is a perspective view of an ignition coil and wire arrangement connected using the connection position assurance arrangement of FIG. 2.

Each of connector holding portions 32 and 33 of device 30 defines a central cavity 50, 60 respectively, adapted to hold the ignition coil connector 24 of an ignition wire 20 as seen in the assembled view of FIG. 3. Central cavity 50 of connector holding portion 32 is provided with several openings to the outside for access and insertion of ignition wire 20. Two of these openings provide for insertion. Cable insertion opening 51 is provided in the outer end wall 52 of connector holding portion 32 and extends from the front wall 53 to the back wall 54 thereof as seen in FIG. 1. Cable insertion opening 51 has a vertical dimension sufficient for the insertion of cable portion 22 of ignition wire 20, horizontally aligned with the opening, from the left in FIG. 1, through outer end 52 into central cavity 50. This insertion is further made possible by two additional openings: a cable access opening 55 through front wall 53 which joins cable insertion opening 51, and a connector insertion opening 56 in back wall 54, which also joins cable insertion opening 51. These two additional openings split outer end 52 vertically into two separate sections so that horizontal cable portion 22 can pass therethrough into central cavity 50 and project therefrom in both directions through openings 55 and 56 as seen in FIG. 2. From this position, cable 22 can be pulled toward the viewer in FIG. 2 so as to pull connector 24 into central cavity 50 through connector insertion opening 56, until it is lodged within central cavity 50, with its in-line portion 25 and/or cable 22 projecting out of cavity 50 through cable access opening 55 and its connecting portion 26 vertically aligned and opening downward toward or through a connector access opening 57 in the bottom wall 58 of connector holding portion 32 to permit connection to vertical connecting stub 12 of ignition coil 10. Connector access opening 57 joins connector insertion opening 56 to permit such entry of connector portion 24 into central cavity 50. In this embodiment, there is no opening through upper wall 59 of connector holding portion 32.

A similar arrangement is provided for the other connector holding portion 33 of device 30, with central cavity 60 and other similar openings and walls numbered similarly in the 60's to their counterparts, in the 50's, of connector holding portion 32 described above. Thus, a second ignition wire is inserted into connector holding portion 33, with cable portion 22 passing through cable insertion opening 61 in outer wall 62 and then connector portion 24 entering through connector insertion opening 66 in back wall 64. Connector portion 24 is then held snugly within central cavity 60, with cable portion 22 exiting central cavity 60 through cable access opening 65 in front wall 63 and perpendicular connecting portion 26 positively connecting with the other one of terminal posts 12 of ignition coil 10 through connector access opening 67 in bottom wall 68. No opening is provided in upper wall 69. Both connector portions 24 are thus accurately placed and positively connected to the terminal posts 12 of ignition coil 10 as seen in FIG. 3.

When inserted, connector portions 24 are snugly held by the walls of connector holding portion 32 within cavity 50 and connector holding portion 33 within cavity 60, so as to provide a fixed spatial relationship, both vertically and horizontally, between connector portions 24 and mounting surface 37 of device 30. Specifically, the horizontal centers of central cavities 50 and 60, through which the vertical axes of perpendicular connector portions 26 will run when connector portions 24 are firmly seated therein, are horizontally spaced from the axis of bolt opening 35 by the same distances and in the same directions as the axes of terminal posts 12 are horizontally spaced from the axis of bolt opening 19. Thus, when device 10 is vertically held with bolt opening 35 centered on bolt opening 19, the perpendicular connector portions 26 of captured connector portions 24 can be lined up axially with terminal posts 12. In addition, the vertical distance from bottom mounting surface 37 of device 10 to the lower surfaces 70 and 71 of upper walls 59 and 69 respectively, are the same as the vertical distance between mounting surface 18 of ignition coil 10 and the top of a connector portion 24 correctly engaged with a terminal post 12. This spatial relationship thus ensures that, when device 30 is mounted by bolt 40 with mounting surface 37 engaging mounting surface 18 of ignition coil 10, connector portions 24 are fully and positively connected on vertical terminal posts 12 of ignition coil 10. Cable access openings 55 and 65 have wide horizontal dimensions and may be beveled at the horizontal ends to permit a degree of rotation about the vertical axis of vertically aligned, perpendicular female connecting portions 26 for the optimal horizontal cable exit angles from device 30. But regardless of the rotational position of perpendicular female connecting portions 26 about a vertical axis within central cavities 50 and 60, the positive physical and electrical connection of connector portions 24 on terminal posts 12 are maintained by device 30 as long as the latter is retained by bolt 40 on ignition coil 10.

The use of device 30 in installing ignition wires 20 to ignition coil 10 begins with the insertion of connector portions 24 of ignition wires 20 into the connector holding portions 32 and 33 of device 30 as described above. This may occur in the assembly of ignition wiring harnesses; and the harnesses are thus shipped with one or more devices 30 attached. In this case, the bolt(s) 40 may be shipped together with the harnesses or supplied separately at the ignition system assembly site. Alternatively, devices 30 may also be supplied separately at the ignition system assembly site.

With a pair of ignition wires 20 retained in device 30 as described above, bolt 40 is dropped through opening 35, and device 30 is held vertically above ignition coil 10 with tower portion 31 and bolt 40 vertically aligned with bolt opening 19 and the downwardly projecting perpendicular connector portions 26 of ignition wires 20 vertically aligned with terminal posts 12. The lower threaded portion 43 of bolt 40 is inserted in bolt opening 19 and driven downward therein, or therethrough into the bolt retaining opening in powertrain component 8, if such opening is provided. Device 30 is driven down with it and pushes perpendicular connecting portions 26 of connectors 24 downward onto terminal posts 12. The spatial relationships established by device 30 ensure that, when bolt 40 drives bottom mounting surface 37 of tower portion 31 into abutting engagement with mounting surface 18 of ignition coil 10, the internal retention apparatus of connector portions 24 will be in engagement with grooves 14 of connector stubs 12, precisely within design parameters. Bolt 40 and device 30 will then maintain these connections securely. In addition, the bolt driving is preferably aided by mechanical or power wrenches to decrease the physical stress of the installation.

Figure 4:
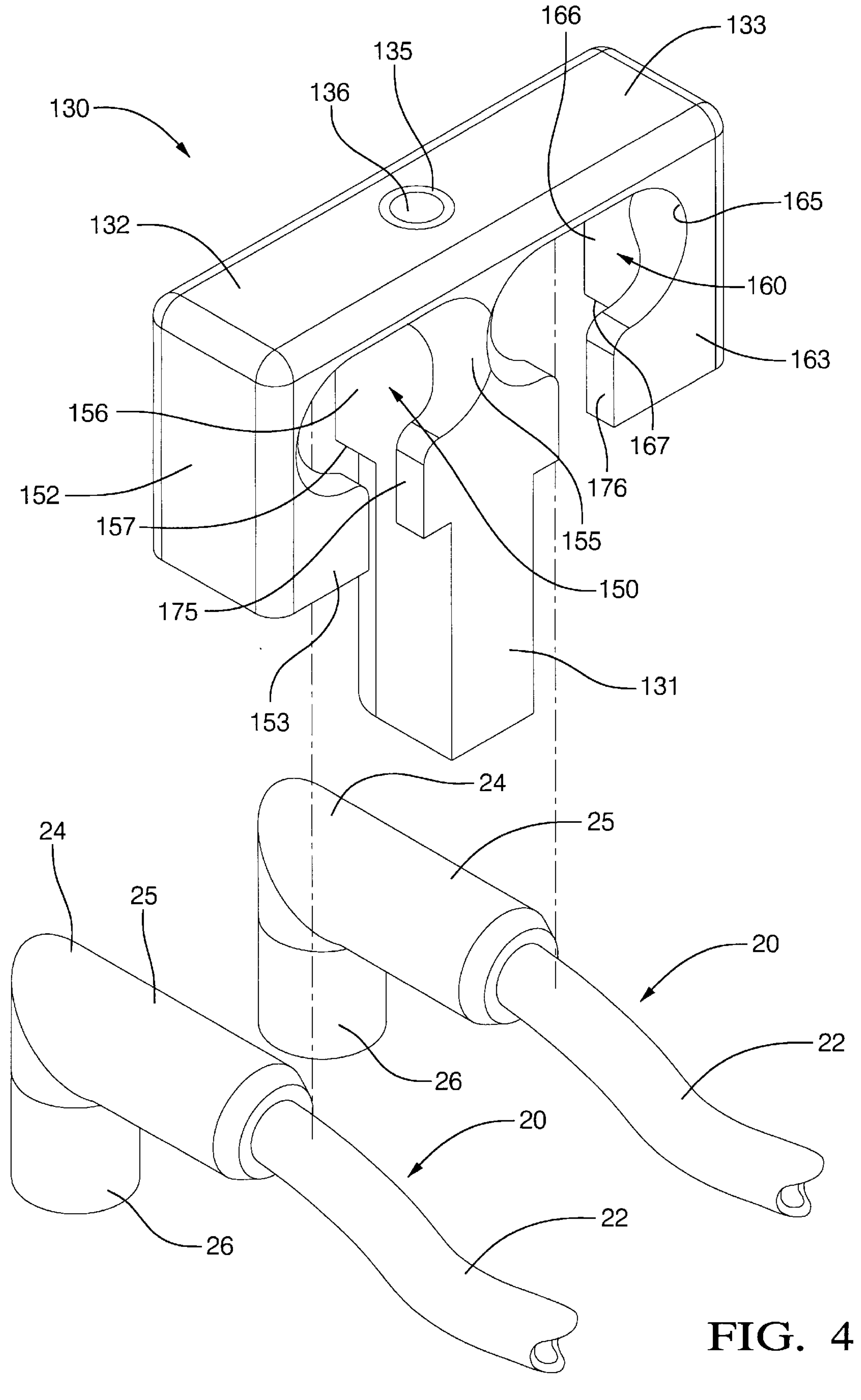
FIG. 4 is a perspective view of an alternate embodiment of the connection position assurance device shown in FIG. 1.

Another embodiment of this invention is shown in FIG. 4. Device 130 is similar in structure to device 30 of FIG. 1, and similar portions of the structure are provided with similar reference numerals in the range 100–199. Connector insertion openings 156 and 166, cable access openings 155 and 165, and connector access openings 157 and 167 are essentially the same as the similarly numbered openings in the embodiment of FIG. 1, as are bolt opening 135 and tubular insert 136. But cable insertion openings 175 and 176 open through front walls 153 and 163, respectively, and join with cable access openings 155 and 165, respectively, to provide upward insertion of cable 22 into central cavities 150 and 160, respectively, from below. Cable insertion openings 175 and 176 preferably have widths larger than the outer diameter of cable 22 but smaller than the outer diameter of in-line portion 25 of connector portion 24, so that, once cable portions 22 are inserted from below and connector portions 24 are moved in from the back through connector insertion openings 156 and 166, connector portions 24 are supported by the portions of front walls 153 and 163 on either side of cable insertion openings 175 and 176. Thus, the embodiment of FIG. 4 will provide similar advantages in the positive and accurate connection of ignition wires 20 to ignition coil 10 and the secure maintenance of these connections in vehicle operation as that of FIG. 1.

What is claimed is:

1. A connection position assurance device for an ignition coil connector of an engine ignition wire, the ignition coil connector comprising a portion in line with a cable portion of the vehicle ignition wire and a perpendicular female connecting portion adapted for retained connection on a male terminal post of the ignition coil, the connection position assurance device comprising a T-shaped element having a tower portion with a bolt opening extending lengthwise therethrough and a pair of connector holding portions extending in opposite directions adjacent one end of the tower portion and perpendicular thereto, each of the connector holding portions defining:

a central cavity for receiving the ignition coil connector, a cable insertion opening from the central cavity permitting insertion of the cable portion of the ignition wire oriented perpendicularly to the axis of the tower portion, a connector insertion opening from the central cavity directed perpendicularly to the tower portion, a cable access opening from the central cavity opposite the connector insertion opening, and a connector access opening from the cavity directed parallel to the tower portion away from the one end thereof, whereby the ignition wire may be inserted laterally into the central cavity and then pulled lengthwise to insert the connector into a seated position therein.

2. The connection position assurance device of claim 1 in which each of the cable insertion openings opens through a common wall of the connector holding portion with one of the cable access openings and extends parallel to the tower portion.

3. The connection position assurance device of claim 1 in which each of the cable insertion openings opens through an outer end of the connector holding portions and extends perpendicularly to the tower portion.

4. The connection position assurance device of claim 1 in which each of the connector holding portions is provided with walls for holding the ignition coil connector with the female connecting portion thereof axially aligned with the tower portion, with the cable portion of the vehicle ignition wire projecting out the cable access opening and the perpendicular female connector portion opening toward the connector access opening.

5. An engine ignition wiring harness comprising, in combination:

a first ignition wire having a cable portion, and a connector portion, the connector portion having an in-line portion aligned with the cable portion and a perpendicular female connecting portion adapted for retained connection on a male terminal post of an ignition coil;

a second ignition wire having a cable portion, and a connector portion, the connector portion having an in-line portion aligned with the cable portion and a perpendicular female connecting portion adapted for retained connection on a male terminal post of an ignition coil; and a connection position assurance device comprising a T-shaped element having a tower portion with a bolt opening extending lengthwise therethrough and a pair of connector holding portions extending in opposite directions adjacent one end of the tower portion and perpendicular thereto, each of the connector holding portions defining a central cavity, a connector access opening from the cavity directed parallel to the tower portion away from the one end thereof and a cable access opening directed perpendicularly to the connector access opening, each of the connector holding portions holding a connector portion of one of the ignition wires with the perpendicular female connecting portion axially aligned with the tower portion and opening toward the connector access opening and the cable portion projecting out of the cable access opening.

6. The engine ignition wiring harness of claim 5 in which each connector holding portion of the connection position assurance device further comprises a cable insertion opening from the central cavity permitting insertion of the cable portion of the ignition wire oriented perpendicularly to the axis of the tower portion, and a connector insertion opening from the central cavity directed perpendicularly to the tower portion opposite the cable access opening, whereby each of the ignition wires may be removed and reinserted.

7. The engine ignition wiring harness of claim 6 in which each of the cable insertion openings opens through an outer end of the connector holding portions and extends perpendicularly to the tower portion.

8. The engine ignition wiring harness of claim 6 in which each of the cable insertion openings opens through a common wall of the connector holding portion with one of the cable access openings and extends parallel to the tower portion.

9. An engine ignition system assembly comprising, in combination:

an engine powertrain component;

an ignition coil on the engine powertrain component, the ignition coil having a pair of terminal posts projecting therefrom in axially parallel, spaced relationship and an adjacent mounting surface adjacent a bolt opening;

a first ignition wire having a cable portion, and a connector portion, the connector portion having an in-line portion aligned with the cable portion and a perpendicular female connecting portion;

a second ignition wire having a cable portion, and a connector portion, the connector portion having an in-line portion aligned with the cable portion and a perpendicular female connecting portion;

a connection position assurance device comprising a T-shaped element having a tower portion with a bolt opening extending lengthwise therethrough, a mounting surface and a pair of connector holding portions extending in opposite directions adjacent one end of the tower portion and perpendicular thereto, each of the connector holding portions defining a central cavity, a connector access opening from the cavity directed parallel to the tower portion away from the one end thereof and a cable access opening directed perpendicularly to the connector access opening, each of the connector holding portions holding a connector portion of one of the ignition wires with the perpendicular female connecting portion axially aligned with the tower portion and engaged with one of the terminal posts of the ignition coil through the connector access opening and the cable portion projecting out of the cable access opening; and a bolt extending through the bolt opening of the tower portion and into the bolt opening of the ignition coil to maintain the connection position assurance device with the mounting surface thereof engaged with the mounting surface of the ignition coil, and thus maintain the connector portions of the ignition wires in accurate and positive engagement with the terminal posts of the ignition coil.

10. The engine ignition system assembly of claim 9 in which the bolt is retained in the bolt opening of the ignition coil.

11. The engine ignition system assembly of claim 9 in which the bolt projects through the bolt opening of the ignition coil and is retained by the engine powertrain component.

12. The engine ignition system assembly of claim 9 in which each connector holding portion of the connection position assurance device further comprises a cable insertion opening from the central cavity permitting insertion of the cable portion of the ignition wire oriented perpendicularly to the axis of the tower portion, and a connector insertion opening from the central cavity directed perpendicularly to the tower portion opposite the cable access opening, whereby each of the ignition wires may be removed and re-inserted.

13. The engine ignition system assembly of claim 12 in which each of the cable insertion openings opens through an outer end of the connector holding portions and extends perpendicularly to the tower portion.

14. The engine ignition system assembly of claim 12 in which each of the cable insertion openings opens through a common wall of the connector holding portion with one of the cable access openings and extends parallel to the tower portion.

15. A method of connecting ignition wires to an engine ignition coil, comprising the steps of:

providing an engine ignition coil having a pair of male terminal posts projecting therefrom in axially parallel, spaced relationship and an adjacent mounting surface adjacent a bolt retaining opening;

providing a pair of engine ignition wires assembled in a connection position assurance device, each of the ignition wires comprising a cable portion and a connector portion, the connector portion having an in-line portion aligned with the cable portion and a perpendicular female connecting portion, and the connection position assurance device comprising a T-shaped element having a tower portion with a bolt opening extending lengthwise therethrough, a mounting surface and a pair of connector holding portions extending in opposite directions adjacent one end of the tower portion and perpendicular thereto, each of the connector holding portions defining a central cavity, a connector access opening from the cavity directed parallel to the tower portion away from the one end thereof and a cable access opening directed perpendicularly to the connector access opening, each of the connector holding portions holding a connector portion of one of the ignition wires with the perpendicular female connecting portion axially aligned with the tower portion and engaged with one of the terminal posts of the ignition coil through the connector access opening and the cable portion projecting out of the cable access opening;

providing a bolt in the bolt opening of the tower portion of the connection position assurance device;

holding the connection position assurance device so that the bolt opening thereof is axially aligned with the bolt retaining opening of the ignition coil and the perpendicular connecting portions of each of the ignition wires is axially aligned with one of the terminal posts of the ignition coil;

advancing the connection position assurance device toward the ignition coil so that the bolt enters the bolt opening of the ignition coil and the perpendicular connecting portions of the ignition wires engage the respective terminal posts of the ignition coil until the mounting surface of the tower portion of the connection position assurance device engages the mounting surface of the ignition coil;

providing an engine powertrain component; and engaging the bolt with one of the ignition coil and the engine powertrain component for retention, whereby the ignition wires are accurately and positively connected to the terminal posts of the ignition coil.

16. The method of claim 15 in which the bolt is engaged with the ignition coil.

17. The method of claim 15 in which the bolt passes through the bolt opening of the ignition coil and is engaged with the engine powertrain component.

18. The method of claim 15 in which each connector holding portion of the connection position assurance device further comprises a cable insertion opening from the central cavity permitting insertion of the cable portion of the ignition wire oriented perpendicularly to the axis of the tower portion, and a connector insertion opening from the central cavity directed perpendicularly to the tower portion opposite the cable access opening, whereby each of the ignition wires may be removed and re-inserted and in which the step of providing a pair of engine ignition wires assembled in a connection position assurance device comprises:

inserting the cable portion of each ignition wire in one of the connector holding portions of the connection position assurance device until each ignition wire passes through the associated central cavity, cable access opening and connector insertion opening thereof; and moving the connector portion of each of the ignition wires into the central cavity of the associated connector holding portion through the connector insertion opening until it is positively seated therein with the perpendicular female connecting portion aligned with and opening toward the connector access opening thereof.

19. A method of assembling ignition wires in an engine ignition wiring harness, comprising the steps of:

providing a pair of engine ignition wires, each of the ignition wires comprising a cable portion and a connector portion, the connector portion having an in-line portion aligned with the cable portion and a perpendicular female connecting portion;

providing a connection position assurance device comprising a T-shaped element having a tower portion with a bolt opening extending lengthwise therethrough, a mounting surface and a pair of connector holding portions extending in opposite directions adjacent one end of the tower portion and perpendicular thereto, each of the connector holding portions defining a central cavity, a central cavity for receiving the ignition coil connector, a cable insertion opening from the central cavity permitting insertion of the cable portion of the ignition wire oriented perpendicularly to the axis of the tower portion, a connector insertion opening from the central cavity directed perpendicularly to the tower portion, a cable access opening from the central cavity opposite the connector insertion opening, and a connector access opening from the cavity directed parallel to the tower portion away from the one end thereof;

inserting the cable portion of each ignition wire in one of the connector holding portions of the connection position assurance device until each ignition wire passes through the associated central cavity, cable access opening and connector insertion opening thereof; and moving the connector portion of each of the ignition wires into the central cavity of the associated connector holding portion through the connector insertion opening until it is positively seated therein with the perpendicular female connecting portion aligned with and opening toward the connector access opening thereof.

* * * * *